US011461595B2

(12) United States Patent
Akiyama et al.

(10) Patent No.: US 11,461,595 B2
(45) Date of Patent: Oct. 4, 2022

(54) IMAGE PROCESSING APPARATUS AND EXTERNAL ENVIRONMENT RECOGNITION APPARATUS

(71) Applicant: CLARION CO., LTD., Saitama (JP)

(72) Inventors: Yasuhiro Akiyama, Tokyo (JP); Koichi Hamada, Tokyo (JP)

(73) Assignee: CLARION CO., LTD., Saitama (JP)

(*) Notice: Subject to any disclaimer, the term of this patent is extended or adjusted under 35 U.S.C. 154(b) by 0 days.

(21) Appl. No.: 16/469,770

(22) PCT Filed: Dec. 13, 2017

(86) PCT No.: PCT/JP2017/044759
§ 371 (c)(1),
(2) Date: Jun. 14, 2019

(87) PCT Pub. No.: WO2018/110605
PCT Pub. Date: Jun. 21, 2018

(65) Prior Publication Data
US 2019/0370609 A1    Dec. 5, 2019

(30) Foreign Application Priority Data

Dec. 16, 2016    (JP) .............................. JP2016-244043

(51) Int. Cl.
*G06K 9/62*    (2022.01)
*B60Q 9/00*    (2006.01)
(Continued)

(52) U.S. Cl.
CPC ........... *G06K 9/6262* (2013.01); *B60Q 9/008* (2013.01); *G06K 9/6232* (2013.01); *G06V 20/58* (2022.01);
(Continued)

(58) Field of Classification Search
CPC ............ G06K 9/6262; G06K 9/00805; G06K 9/6232; G06K 9/4628; B60Q 9/008;
(Continued)

(56) References Cited

U.S. PATENT DOCUMENTS 6,766,038 B1 * 7/2004 Sakuma .................. G08G 1/04
340/936
8,001,062 B1 * 8/2011 Gargi ................. G06K 9/00516
706/12
(Continued)

FOREIGN PATENT DOCUMENTS

| JP | 2001-357396 A | 12/2001 |
| JP | 2014-067407 A | 4/2014 |
| JP | 2016-153775 A | 8/2016 |

OTHER PUBLICATIONS

Extended European Search Report dated Jul. 15, 2020 for European Patent Application No. 17879882.3.
(Continued)

*Primary Examiner* — John W Lee
(74) *Attorney, Agent, or Firm* — Volpe Koenig

(57) ABSTRACT

An image processing apparatus includes: an object detection section that performs convolution computation on an input image based on a captured image obtained by capturing the image with a camera, and that detects an object; a feature map validation section that performs feature map validation validating a likelihood that the input image contains the object on the basis of a feature map obtained by the convolution computation; a time series validation section that performs time series validation validating a result of the feature map validation performed by the feature map validation section in time series; and a detection result correction section that corrects a detection result about the object (Continued)

output by the object detection section on the basis of a result of the time series validation performed by the time series validation section.

10 Claims, 9 Drawing Sheets

(51) Int. Cl.
    *G06V 20/58*     (2022.01)
    *G08G 1/16*     (2006.01)
    *B60W 30/09*     (2012.01)
    *G06T 1/00*     (2006.01)
    *G06T 7/00*     (2017.01)
    *G06V 10/44*     (2022.01)
    *G06V 10/82*     (2022.01)

(52) U.S. Cl.
    CPC ............... *G08G 1/16* (2013.01); *B60W 30/09* (2013.01); *B60W 2420/42* (2013.01)

(58) Field of Classification Search
    CPC .... G08G 1/16; B60W 30/09; B60W 2420/42; G06T 1/00; G06T 7/00
    See application file for complete search history.

(56) References Cited

U.S. PATENT DOCUMENTS

| | | | | |
|---|---|---|---|---|
| 2004/0071367 | A1* | 4/2004 | Irani | G06T 7/20 382/284 |
| 2005/0105781 | A1* | 5/2005 | Sakamoto | G06V 40/30 382/119 |
| 2006/0120564 | A1* | 6/2006 | Imagawa | G06V 40/20 382/103 |
| 2014/0086477 | A1* | 3/2014 | You | B60Q 9/008 382/154 |
| 2014/0193071 | A1* | 7/2014 | Cho | G06V 20/52 382/170 |
| 2015/0265251 | A1 | 9/2015 | Cho et al. | |
| 2016/0238703 | A1 | 8/2016 | Liu et al. | |
| 2017/0124409 | A1* | 5/2017 | Choi | G06V 10/454 |

OTHER PUBLICATIONS

Fukui et al: "Research trends for detecting pedestrian using Deep Learning" Dec. 8, 2016, vol. 116 No. 366, pp. 37-46 IEICE technical report.

Yoshiki Ninomiya; "The Present Condition and the Future Prospective of the Image Recognition Technology for Smart Vehicles", Information Processing Society of Japan, Dec. 15, 2010, vol. 51 No. 12.

International Search Report dated Mar. 20, 2018 for the International PCT Application No. PCT/JP2017/044759.

International Preliminary Report on Patentability (PCTIPEA409) dated Oct. 25, 2018 for the International PCT Application No. PCT/JP2017/044759.

Communication pursuant to Article 94(3) EPC dated May 6, 2022 for European Patent Application No. 17879882.3.

* cited by examiner

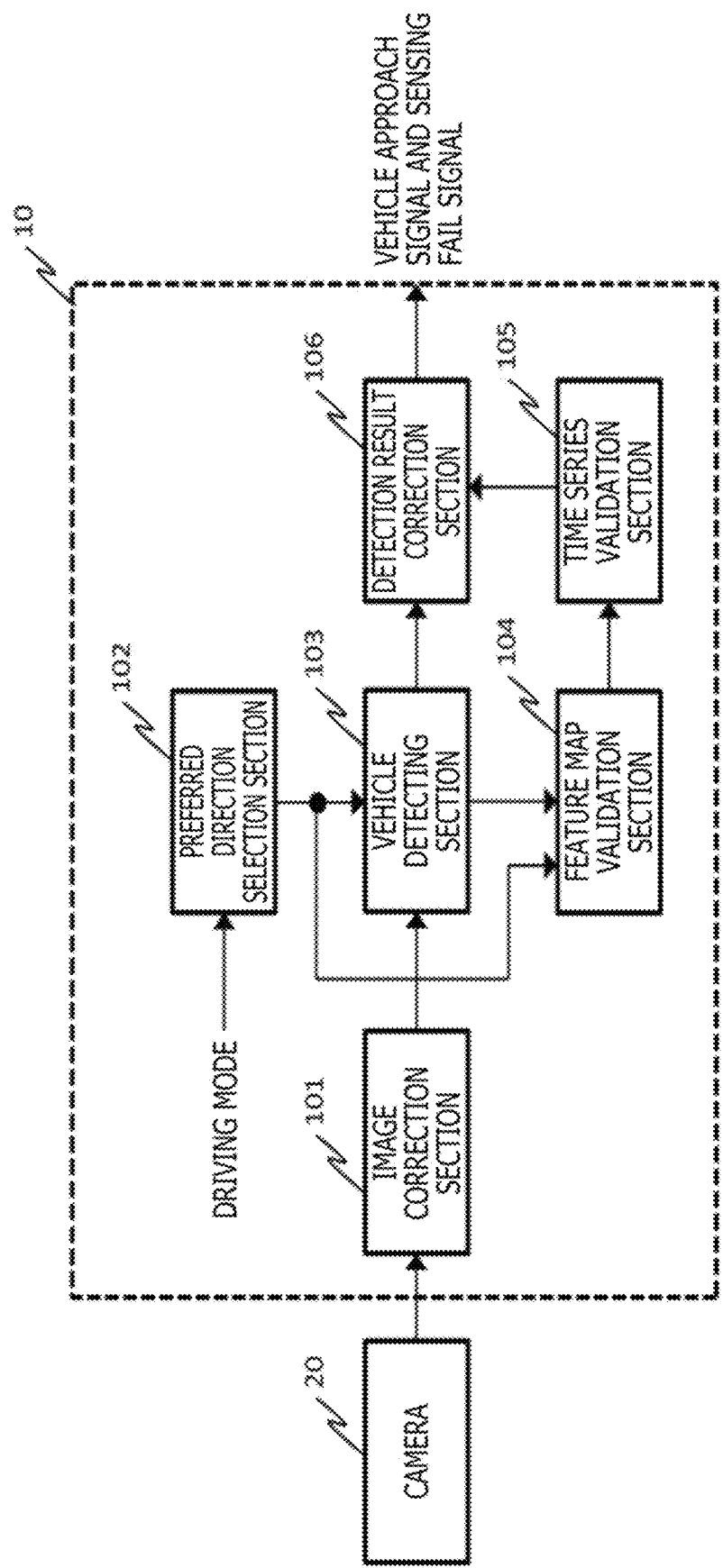

FIG. 3

| DRIVING MODE | ORDINARY ROAD | EXPRESSWAY |
|---|---|---|
| MOVE-FORWARD | BACKWARD | BACKWARD |
| MOVE-BACKWARD | BACKWARD | ALL DIRECTIONS |
| PARKING ASSISTANCE (STARTING FROM PARALLEL PARKING) | FORWARD AND BACKWARD | ALL DIRECTIONS |

VEHICLE

NON-VEHICLE

NON-VEHICLE

NON-VEHICLE

NON-VEHICLE

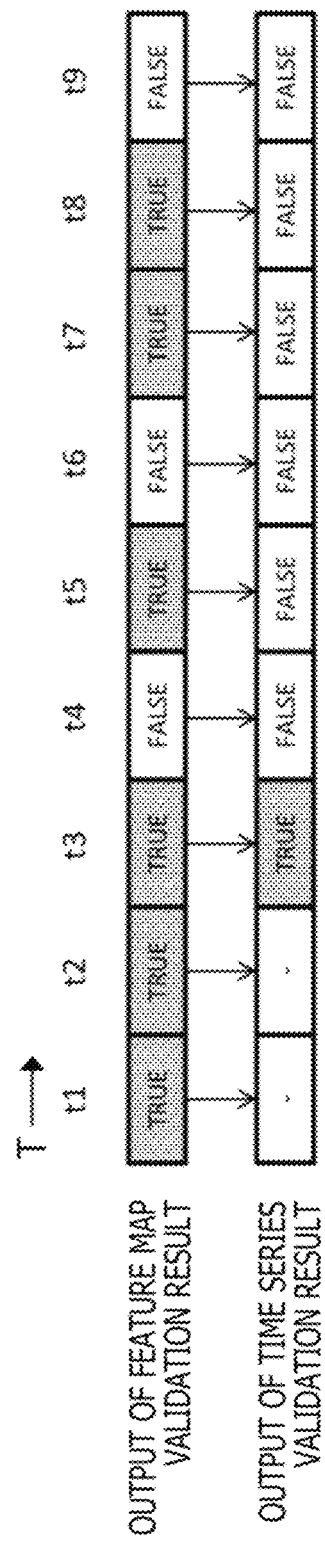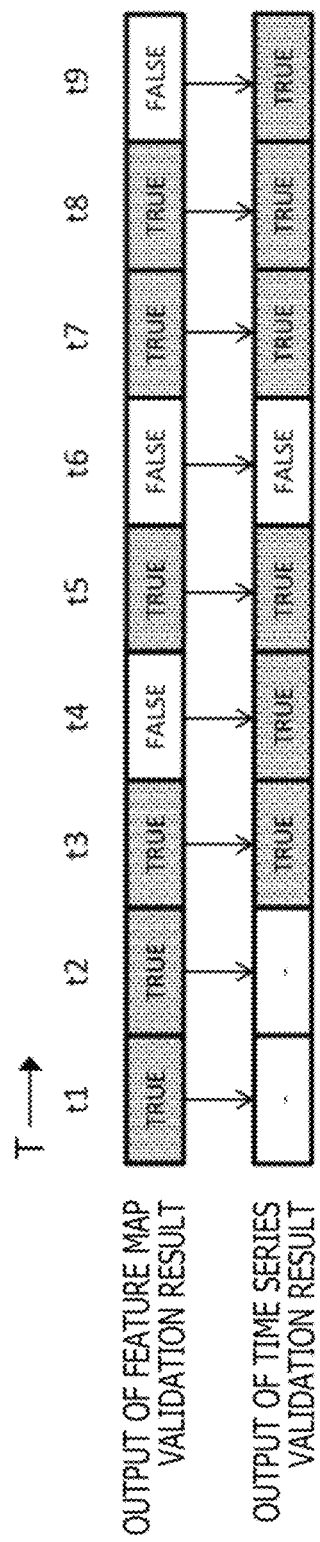

IMAGE PROCESSING APPARATUS AND EXTERNAL ENVIRONMENT RECOGNITION APPARATUS

TECHNICAL FIELD

The present invention relates to an image processing apparatus and an external environment recognition apparatus.

BACKGROUND ART

In recent years, the development of a technology for monitoring surrounding circumferences of a driver's own vehicle by an in-vehicle camera and, when sensing a danger, issuing a warning to the driver and automatically controlling behaviors of the own vehicle for avoiding an accident such as a collision between vehicles and a collision between the vehicle and a person is underway. For such preventive safety and automatic driving control for the own vehicle, it is necessary to always continue to monitor approaching of a vehicle present around the own vehicle as an observation object. With the technology of this type, not only the vehicle as the observation object but also various objects such as surrounding structures in the background appear in images captured by the in-vehicle camera. Owing to this, it is difficult to accurately identify and sense the observation object, resulting in the occurrence of false sensing.

As a technique for resolving the false sensing resulting from the background in the image, it is proposed to recognize a road surface region in which a vehicle can drive and execute vehicle sensing on the road surface region. In respect to this technique, Patent Document 1, for example, discloses a method of determining whether a vehicle can drive in a region by creating a gray-scale map from a disparity image captured with a stereo camera and identifying a road surface in images using this gray-scale map.

PRIOR ART DOCUMENT

Patent Document

Patent Document 1: JP-2014-67407-A

SUMMARY OF THE INVENTION

Problems to be Solved by the Invention

The gray-scale map described in Patent Document 1 is typically narrow in a dynamic range for information that can be expressed and is susceptible to the influence of surrounding brightness. It is, therefore, often difficult to accurately identify a road surface in the images with the technique of Patent Document 1, and in such a case, it is difficult to accurately sense an object such as the other vehicle present around the own vehicle from the captured images.

Means for Solving the Problems

An image processing apparatus according to a first aspect of the present invention includes: an object detection section that performs convolution computation on an input image based on a captured image obtained by capturing the image with a camera and that detects an object; a feature map validation section that performs feature map validation validating a likelihood that the input image contains the object on a basis of a feature map obtained by the convolution computation; a time series validation section that performs time series validation validating in time series a result of the feature map validation performed by the feature map validation section; and a detection result correction section that corrects a detection result about the object, the detection result being output by the object detection section, on a basis of a result of the time series validation performed by the time series validation section.

An external environment recognition apparatus according to a second aspect of the present invention includes the image processing apparatus, and outputs at least one of a warning signal for warning a driver of the own vehicle and a vehicle control signal for controlling an operation of the own vehicle, on a basis of a corrected sensing result about the other vehicle, the corrected sensing result being corrected by the detection result correction section.

Advantage of the Invention

According to the present invention, it is possible to accurately sense an object such as the other vehicle present around the own vehicle from the captured image.

BRIEF DESCRIPTION OF THE DRAWINGS

FIG. 1 is a block diagram depicting a functional configuration of an image processing apparatus according to a first embodiment of the present invention.

FIG. 3 is a diagram depicting an example of a setting table used at a time of setting a preferred direction.

FIGS. 8A and 8B are a diagram depicting an example of time series validation.

MODES FOR CARRYING OUT THE INVENTION

First Embodiment

Figure 2B:
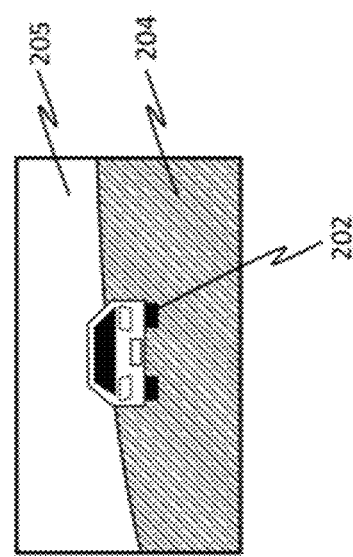
FIGS. 2A and 2B are a diagram depicting a distortion correction process on a captured image.

An image processing apparatus according to a first embodiment of the present invention will be described hereinafter with reference to the drawings. FIG. 1 is a block diagram depicting a functional configuration of an image processing apparatus 10 according to the first embodiment of the present invention. The image processing apparatus 10 depicted in FIG. 1 is used by being mounted in a vehicle. It is noted that the vehicle in which the image processing apparatus 10 is mounted will be referred to as "own vehicle" and the other vehicle present around the own vehicle will be referred to as "the other vehicle" in the following description.

The image processing apparatus 10 is connected to a camera 20 mounted at a predetermined position of the own vehicle corresponding to a photographing region, for example, a body of the own vehicle. The image processing apparatus 10 includes an image correction section 101, a preferred direction selection section 102, a vehicle detection section 103, a feature map validation section 104, a time series validation section 105, and a detection result correction section 106. It is noted that the functions of the image processing apparatus 10 depicted in FIG. 1 can be realized by appropriately combining hardware such as a microcomputer and a memory with various programs run on the microcomputer.

The camera 20 photographs the other vehicle present around the own vehicle as a video or still images at intervals of predetermined time, and outputs each frame of the acquired video or each still image to the image correction section 101 as a captured image per predetermined time. It is noted that the camera 20 can be installed in an arbitrary location in the own vehicle for facilitating recognizing the other vehicle by the image processing apparatus 10. For example, the camera 20 is installed in a portion such as a front bumper, a rear bumper, and left and right sideview mirrors. Alternatively, the camera 20 may be installed in an inside of the own vehicle. Furthermore, the camera 20 may be solely installed with a view to recognition of the other vehicle present only in a specific region around the own vehicle or a plurality of cameras 20 may be installed so that the other vehicle can be recognized in all regions around the own vehicle.

In the present embodiment, a fish-eye lens camera is used as the camera 20. The fish-eye lens camera is a camera using a fish-eye lens having lens light condensing characteristics greatly shifted to a wide angle side compared with a lens used in an ordinary camera, and has an advantageously wide photographing range. It is preferable to be capable of photographing a wide range with one camera at a time in this way in terms of image processing in vehicle sensing. On the other hand, the captured image obtained by the camera 20 is a so-called fish-eye image, so that the captured image tends to have greater distortions and lower resolutions in regions closer to upper, lower, left, and right ends of the captured image corresponding to positions farther from the own vehicle. Owing to this, the distorted captured image input from the camera 20 is disadvantageously not suited for vehicle sensing.

To solve the problem, the captured image obtained by the camera 20 is input to the image correction section 101 in the image processing apparatus 10. The image correction section 101 performs a distortion correction process on the captured image (fish-eye image) input from the camera 20, thereby transforming the captured image into an undistorted image suited for vehicle sensing. For example, a nonlinear local geometric correction for transforming the captured image into an actual space map using known distortion characteristics of the fish-eye lens or a linear local geometric correction for correcting the captured image using distortion factors that simply express the distortion characteristics of the fish-eye lens in the distortion correction process performed by the image correction section 101. It is noted that an algorithm other than these examples can be selected without problems in the distortion correction process.

Figure 2A:
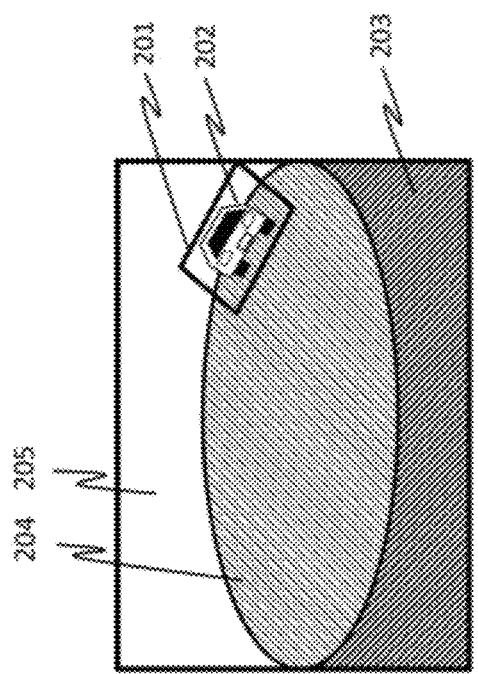

FIGS. 2A and 2B are a diagram depicting the distortion correction process on the captured image performed by the image correction section 101. FIG. 2A is an example of a fish-eye image obtained by capturing the image with the camera 20 installed in the right sideview mirror of the own vehicle. In this fish-eye image, a left side part corresponds to a forward direction, that is, a frontward direction of the own vehicle and a right side part corresponds to a backward direction, that is, a rearward direction of the own vehicle. In FIG. 2A, a road surface 204 appears in a central portion of the image, a background 205 such as the sky appears in an upper portion of the image, a body 203 of the own vehicle appears in a lower portion of the image, and the other vehicle 202 approaching the own vehicle from rearward appears.

The image correction section 101 sets, for example, a region containing the other vehicle 202 as a correction object region 201 to the fish-eye image such as that in FIG. 2A, and performs the distortion correction process on an image part within this correction object region 201. FIG. 2B is an example of a corrected image obtained by performing the distortion correction process on the correction object region 201 in FIG. 2A. In this corrected image, the other vehicle 202, the road surface 204, and the background 205 are corrected to appear equal to an actual space map.

While a case of setting the correction object region 201 around the other vehicle 202 and performing the distortion correction process has been described in the example of FIGS. 2A and 2B, the image correction section 101 can perform the distortion correction process on an arbitrary region in the captured image set as a correction object region. Alternatively, a plurality of correction object regions may be set in the captured image and the image correction section 101 may perform the distortion correction process on each correction object region. In another alternative, in a case in which vehicle sensing is performed using a small distorted part in the captured image, a case in which the camera 20 is an ordinary camera that is not the fish-eye lens camera, or the like, the image processing section 101 may not perform the distortion correction process. In this case, the image processing apparatus 10 may not include the image correction section 101.

The preferred direction selection section 102 sets a preferred direction that is a direction in which the other vehicle that is a sensing object should be preferentially sensed, on the basis of a driving state of the own vehicle. To determine the driving state of the own vehicle, a signal that indicates a driving mode of the own vehicle is input to the preferred direction selection section 102.

FIG. 3 is a diagram depicting an example of a setting table used when the preferred direction selection section 102 sets the preferred direction. In the setting table of FIG. 3, driving modes of the own vehicle include move-forward, move-backward, and parking assistance modes. In addition, in the setting table of FIG. 3, indicated preferred directions differ between an ordinary road and an expressway. The preferred direction selection section 102 acquires a signal indicating the driving mode of the own vehicle from, for example, a vehicle control CPU mounted in the own vehicle, thereby making it possible to determine what mode the own vehicle is in and to determine whether the own vehicle is traveling on the ordinary road or the expressway.

The preferred direction selection section 102 sets the preferred direction in response to the driving mode and the driving road of the own vehicle on the basis of the setting table of FIG. 3. In a case, for example, in which the driving mode of the own vehicle is the move-forward mode, the preferred direction selection section 102 sets a backward direction of the own vehicle as the preferred direction irrespectively of whether the driving road is the ordinary road or the expressway. In other words, when the own vehicle is moving forward, the preferred direction selection section 102 sets the backward direction of the own vehicle as the preferred direction so that it is possible to preferentially sense the other vehicle approaching the own vehicle from backward irrespectively of the type of the driving road.

On the other hand, in a case in which the driving mode of the own vehicle is the move-backward mode and the driving road is the ordinary road, the preferred direction selection section 102 sets the backward direction of the own vehicle as the preferred direction, and in a case in which the driving mode of the own vehicle is the move-backward mode and the driving road is the expressway, the preferred direction selection section 102 sets all directions around the own vehicle as the preferred directions. In other words, when the own vehicle is moving backward on the ordinary road, the preferred direction selection section 102 sets the backward direction of the own vehicle as the preferred direction so that it is possible to preferentially sense the other vehicle approaching the own vehicle from backward similarly to the move-forward mode. Furthermore, it is not normally assumed that the own vehicle moves backward on the expressway (except for parking lots). However, if such a situation occurs, a degree of danger is sufficiently high; thus, setting the all directions around the own vehicle as the preferred directions makes it possible to sense the other vehicle using the entire captured image.

Furthermore, in a case in which the driving mode of the own vehicle is the parking assistance mode and the driving road is the ordinary road, the preferred direction selection section 102 sets forward and backward directions of the own vehicle as the preferred directions, and in a case in which the driving mode of the own vehicle is the parking assistance mode and the driving road is the expressway, the preferred direction selection section 102 sets all the directions around the own vehicle as the preferred directions. In other words, when the own vehicle is to start from parallel parking using parking assistance on the ordinary road, the preferred direction selection section 102 sets the forward and backward directions of the own vehicle as the preferred directions so that it is possible to preferentially sense the other vehicle approaching the own vehicle from forward or backward. Moreover, it is not normally assumed that the own vehicle is parked on the expressway (except for parking lots). However, if such a situation occurs, the degree of danger is sufficiently high; thus, setting all the directions around the own vehicle as the preferred directions makes it possible to sense the other vehicle using the entire captured image.

Upon setting the preferred direction(s) as described above, the preferred direction selection section 102 sets a vehicle sensing region within the input image for sensing other vehicle that is the sensing object on the basis of a setting result. At this time, the preferred direction selection section 102 sets the vehicle sensing region in the light of the preferred direction(s) set for the own vehicle. In a case in which no preferred direction is set, the preferred direction selection section 102 may set a preset region as the vehicle sensing region within the input image or set the entire input image as the vehicle sensing region.

When the image captured by the camera 20 and having been subjected to the distortion correction process by the image correction section 102 is input to the vehicle detection section 103, the vehicle detection section 103 senses the other vehicle that is the detection object present around the own vehicle from this input image. The vehicle detection section 103 executes a predetermined vehicle sensing process on the part set by the preferred direction selection section 102 as the vehicle sensing region within the input image, thereby sensing the other vehicle appearing in the vehicle sensing region. Specifically, using a detector to which a deep learning technique that is one of machine learning techniques is applied, the vehicle detection section 103 executes 2-class detection for determining whether an image within the vehicle sensing region has features as a vehicle, thereby making it possible to sense the other vehicle.

Figure 4A:
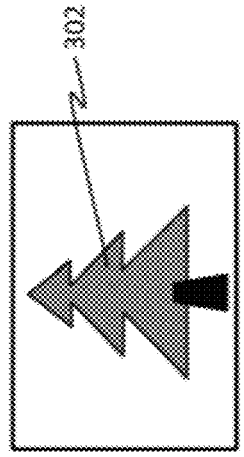
FIGS. 4A-4E are a diagram depicting an example of learning images used at a time of generating a detector.
Figure 4B:
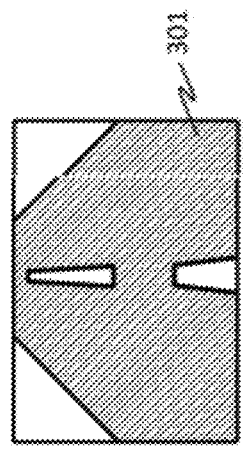
Figure 4C:
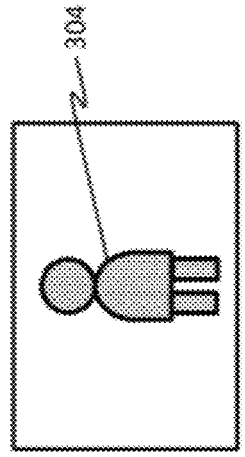
Figure 4D:
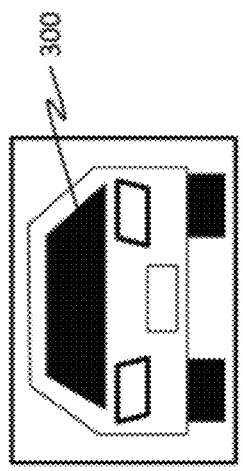
Figure 4E:
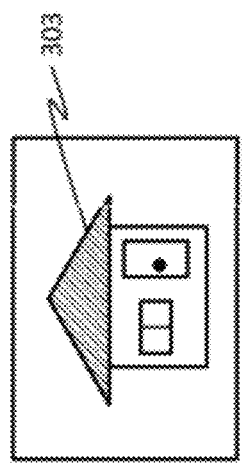

FIGS. 4A-4E are a diagram depicting an example of learning images used at a time of generating a detector of the vehicle detection section 103. FIG. 4A is an example of a vehicle learning image, and FIG. 4B to FIG. 4E are examples of non-vehicle learning images. While a vehicle 300 appears in the learning image of FIG. 4A, subjects other than a vehicle appear in the learning images of FIG. 4B to FIG. 4E. Specifically, a road surface 301 appears in the learning image of FIG. 4B, a tree 302 appears in the learning image of FIG. 4C, a building 303 appears in the learning image of FIG. 4D, and a person 304 appears in the learning image of FIG. 4E. As for the non-vehicle learning images, a subject is not limited to these examples and any subject other than a vehicle may appear in the non-vehicle learning image.

It is noted that images in which subjects with a high appearance frequency in actual vehicle driving scenes appear are preferably used as the non-vehicle learning images. Likewise, it is preferable to use an image in which a vehicle with a high appearance frequency as the vehicle learning image. It is noted, however, that in a case in which such learning images are difficult to collect, an image in which a subject low in appearance frequency but similar in outward appearance appears may be mixed with the learning images.

Meanwhile, the deep learning utilized in the vehicle detection section 103 is generally a processing technique for receiving a plurality of input images of an object, a sensing object, and extracting image features expressing the object, and for automatically setting discriminator parameters so that an unknown input image can be discriminated by detecting learned image features. With the deep learning, it is possible to subdivide image feature parameters common to the plurality of input images and to automatically extract the image feature parameters. A feature extraction method using a neural network structure is known as an example of a feature parameter extraction method. In the neural network structure, many input/output functions (activation functions) reacting only when matching image features common to an input image group and referred to as "neuron units" are combined per small image region and the input/output functions (activation functions) are stacked into a plurality of layers as a pyramid structure. According to this method, the discriminator parameters can be extracted per layer of each neuron unit so that the sensing object can be discriminated step by step while changing a position and an image size of the sensing object, and the discriminator parameters capable of discriminating the entire object can be eventually obtained.

Figure 5:
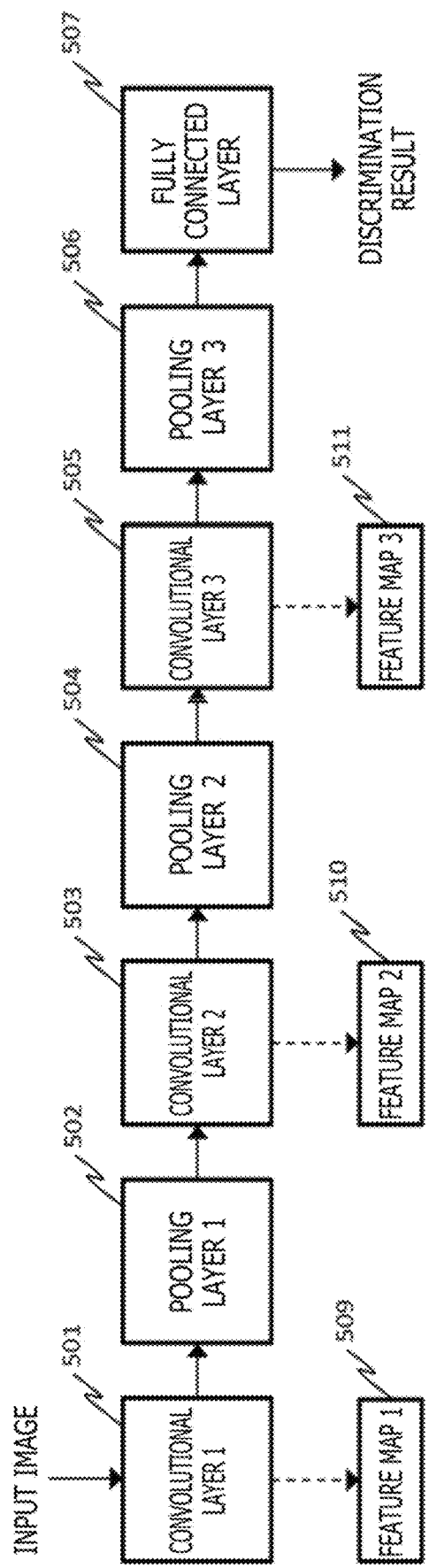
FIG. 5 is a diagram depicting an example of a configuration of a deep learning type vehicle sensor.

FIG. 5 is a diagram depicting an example of a configuration of a deep learning type vehicle sensor in the vehicle detection section 103. The deep learning type vehicle sensor used to sense the other vehicle in the vehicle detection section 103 is configured by connecting a plurality of stages, for example, three stages of combinations as depicted in FIG. 5, of convolutional layers and pooling layers. In FIG. 5, a convolutional layer 501 in the first stage executes convolution computation on image data corresponding to the part in the vehicle sensing region set by the preferred direction selection section 102 out of the image input to the vehicle detection section 103, and extracts a feature map 509 in the first stage. A pooling layer 502 in the first stage aggregates the feature map 509 extracted by the convolutional layer 501 to reduce a data size. A convolutional layer 503 in the second stage executes convolution computation on data about the feature map 509 aggregated by the pooling layer 502, and extract a feature map 510 in the second stage. A pooling layer 504 in the second stage aggregates the feature map 510 extracted by the convolutional layer 503 to reduce a data size. A convolutional layer 505 in the third stage executes convolution computation on data about the feature map 510 aggregated by the pooling layer 504, and extract a feature map 511 in the third stage. A pooling layer 506 in the third stage aggregates the feature map 511 extracted by the convolutional layer 505 to reduce a data size. A fully connected layer 507 discriminates whether the input image indicates the other vehicle by collating data about the feature map 511 aggregated by the pooling layer 506 with the discriminator parameters acquired in advance by the deep learning, and outputs a discrimination result. The other vehicle that is the detection object is thereby detected from the input image in the vehicle detection section 103.

While FIG. 5 depicts an example of the vehicle sensor configured by connecting the three stages of the convolutional layers and the pooling layers, the number of stages of the convolutional layers and the pooling layers configuring the vehicle sensor in the vehicle detection section 103 is not limited to three.

Figure 6:
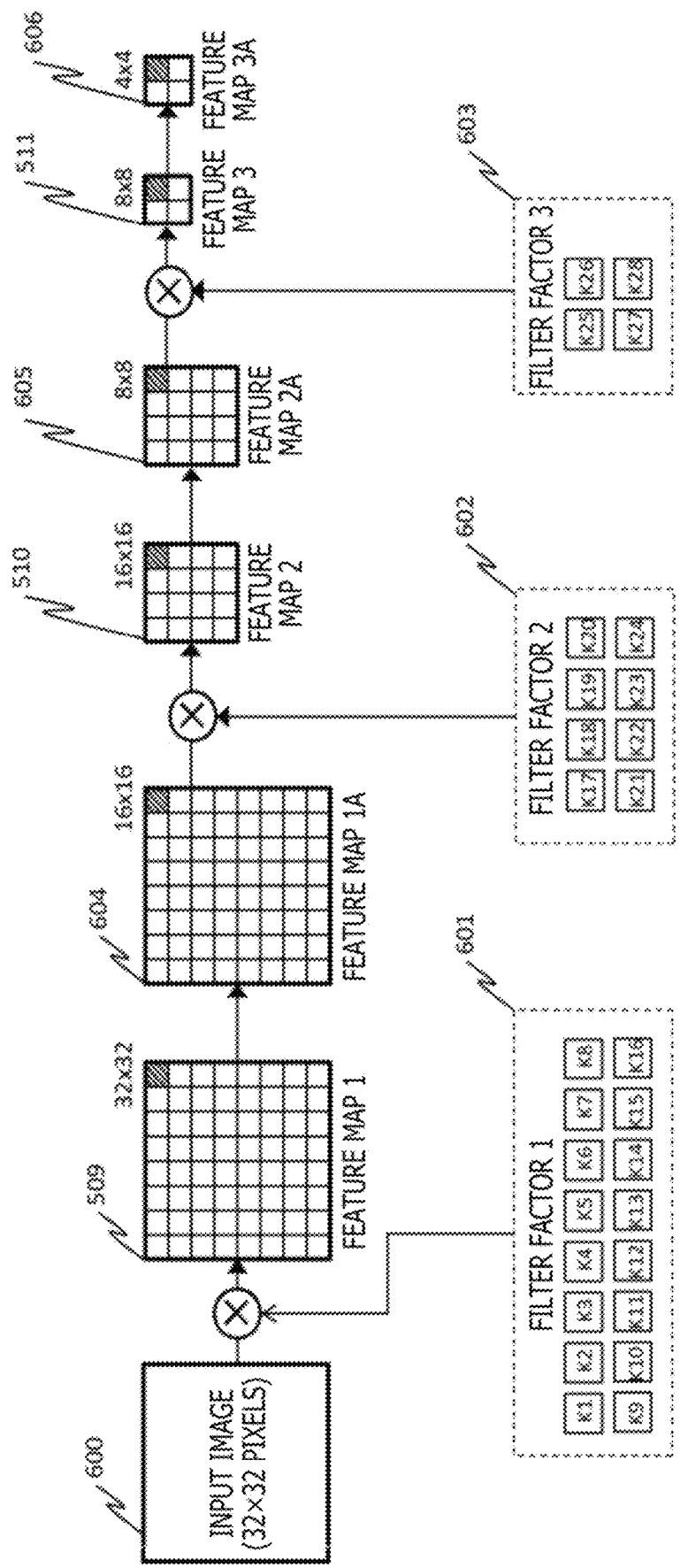
FIG. 6 is a diagram depicting an example of feature maps extracted by convolutional layers in the deep learning type vehicle sensor.

FIG. 6 is a diagram depicting an example of feature maps extracted by the convolutional layers in the deep learning type vehicle sensor exemplarily depicted in FIG. 5. While filter sizes and filter factors of the convolutional layers and aggregation factors of the pooling layers configuring the deep learning type vehicle sensor can be arbitrarily set, the filter sizes, the filter factors, and the aggregation factors are set as follows.

In the example described below, it is assumed that a size of an input image 600 input to the vehicle sensor is 32×32 pixels, filter factors of the convolutional layer 501 in the first stage depicted in FIG. 5 are configured with 16 filter factors K1 to K16 as denoted by reference sign 601 of FIG. 6. It is also assumed that the filter factors of the convolutional layer 503 in the second stage are configured with eight filter factors K17 to K24 as denoted by reference sign 602 of FIG. 6. It is further assumed that the filter factors of the convolutional layer 505 in the third stage are configured with four filter factors K25 to K28 as denoted by reference sign 603 of FIG. 6. It is then assumed that aggregation factors of the pooling layers 502, 504, and 506 in the first to third stages depicted in FIG. 5 are all set to ½.

In a case of parameter conditions described above, the convolutional layer 501 in the first stage performs the convolution computation on the input image 600 using the 16 filter factors K1 to K16. As a result, data that is a combination of 16 types of 32×32 feature data set blocks is obtained as the feature map 509 in the first stage. Next, when the pooling layer 502 in the first stage performs pooling on the feature map 509 with the aggregation factor=½, then the data size is halved and data that is a combination of 16 types of 16×16 feature data set blocks is obtained. The feature map 509 is thereby transformed into a feature map 604 at a half data size.

Subsequently, the convolutional layer 503 in the second stage performs convolution computation on the feature map 604 using the eight filter factors K17 to K24. As a result, data that is a combination of eight types of 16×16 feature data set blocks is obtained as the feature map 510 in the second stage. Next, when the pooling layer 504 in the second stage performs pooling on the feature map 510 with the aggregation factor=½, then the data size is halved, and data that is a combination of eight types of 8×8 feature data set blocks is obtained. The feature map 510 is thereby transformed into a feature map 605 at a half data size.

Moreover, the convolutional layer 505 in the third stage performs convolution computation on the feature map 605 using the four filter factors K25 to K27. As a result, data that is a combination of four types of 8×8 feature data set blocks is obtained as the feature map 511 in the third stage. Next, when the pooling layer 506 in the third stage performs pooling on the feature map 511 with the aggregation factor=½, then the data size is halved, and data that is a combination of four types of 4×4 feature data set blocks is obtained. The feature map 511 is thereby transformed into a feature map 606 at a half data size.

As described above, the vehicle detection section 103 performs the convolution computation on the input image a plurality of times and detects the other vehicle that is the sensing object. The vehicle detection region 103 outputs, for example, information indicating whether an image of the other vehicle is present in the vehicle sensing region set within the input image to the feature map validation section 104 and the detection result correction section 106 as a detection result about the other vehicle.

Meanwhile, the filter factors used in the convolution computation performed by each convolutional layer are a filter numeric value group for image feature extraction that is set to strongly react with image features such as a vertical line, a horizontal line, an oblique line, or a curved line important for image recognition and set to extract only image feature components with which the filter numeric value group has reacted. For example, in an example of vehicle sensing, filter factors are designed to be capable of extract image feature components (such as an outline of the overall vehicle, a line of an engine hood part, a line of a front windshield part, and a shade state of a vehicle body) that configure the vehicle appearing in the input image. In machine learning-based filter designing, it is possible to gain common image components contained in many of the input images. Owing to this, causing a plurality of input images in which the vehicle appears to be learned at a time of image learning in a preparatory stage enables the representative image feature components, which configure the vehicle, to be automatically extracted to be used as the filter factors for the convolution computation.

The feature map validation section 104 performs feature map validation for validating a likelihood that the other vehicle is contained in the input image on the basis of the feature maps obtained by the convolution computation in the vehicle detection section 103. The feature map validation section 104 determines whether each of a plurality of blocks that configure each feature map indicates features of the other vehicle that is the sensing object, and compares a determination result with a placement pattern stored in advance, thereby performing the feature map validation.

It is desirable in the feature maps obtained by the above-described deep learning type vehicle sensor used in the vehicle detection section 103 that data indicating the features of the other vehicle that is the sensing object is present in all the blocks. However, depending on the input image, even in a case of detecting the other vehicle, there may be a case where the feature maps contain a block in which the data indicating the features of the other vehicle is not present or a block having a low value of a degree (feature level) indicating the features of the other vehicle. Furthermore, in such cases, placement of the blocks in which the features of the other vehicle do not appear in the feature maps tends to be similar for each type of the other vehicle. In the present invention, therefore, the feature map validation section 104 performs feature map validation for validating the likelihood that the input image contains the other vehicle on the basis of such placement of blocks in which the features of the other vehicle do not appear in each feature map.

Figure 7C:
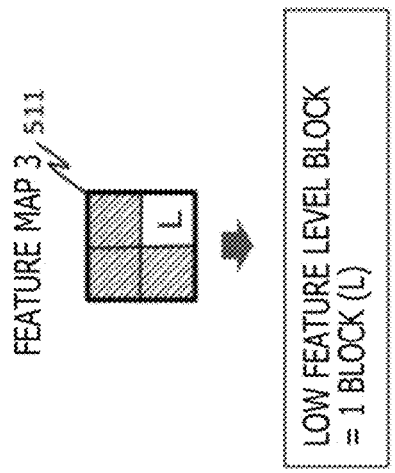
FIGS. 7A-7C are a diagram depicting an example of feature map validation.
Figure 7B:
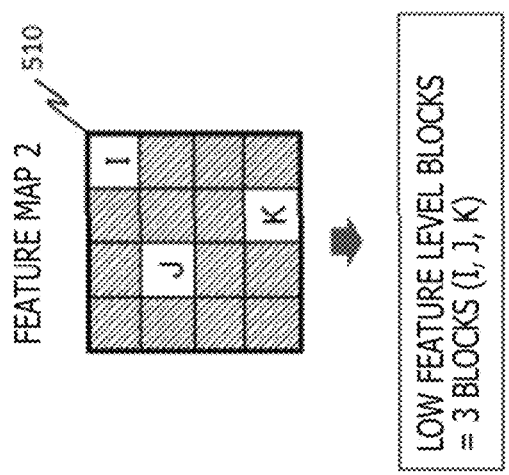
Figure 7A:
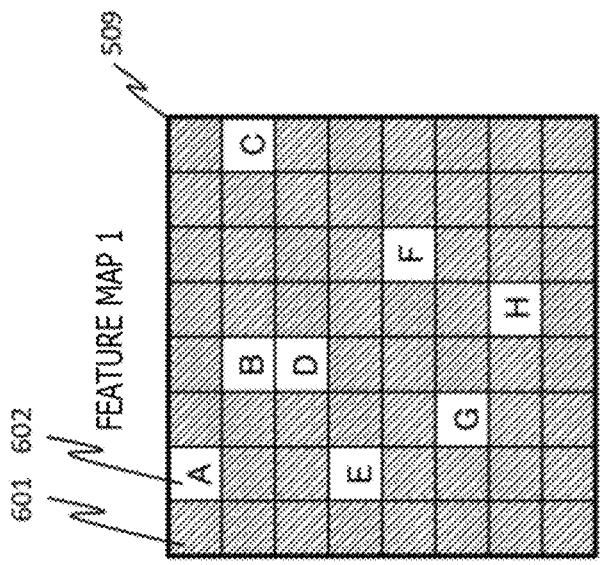

FIGS. 7A-7C are a diagram depicting an example of feature map validation performed by the feature map validation section 104. An operation of the feature map validation will be described below while a case in which the feature maps 509 to 511 obtained by the deep learning type vehicle sensor described with reference to FIGS. 5 and 6 are in states depicted in FIG. 7A, FIG. 7B, and FIG. 7C is taken by way of example.

In the feature map 509 of FIG. 7A, blocks typified by blocks 601 denoted by oblique lines are blocks (active blocks) in which an active feature level indicating the features of the other vehicle that is the sensing object is obtained. On the other hand, blocks typified by the other blocks 602 are blocks (inactive blocks) in which the active feature level indicating the features of the other vehicle is not obtained. In FIG. 7A, the inactive blocks in which the active feature level does not appear are eight blocks denoted by A to H.

Likewise, as for the feature map 510 of FIG. 7B and the feature map 511 of FIG. 7C, blocks denoted by oblique lines represent active blocks and the other blocks represent inactive blocks. In FIG. 7B, the inactive blocks in which the active feature level does not appear are three blocks denoted by I, J, and K. In FIG. 7C, the inactive block in which the active feature level does not appear is one block denoted by L.

The feature map validation section 104 stores, in advance, placement patterns of the feature maps corresponding to the convolutional layers 501, 503, and 505 of FIG. 5 that configure the deep learning type vehicle sensor in the vehicle detection section 103. These placement patterns of the feature maps each represent a pattern of positions at which the active blocks indicating the features of the other vehicle and the inactive blocks not indicating the features of the other vehicle appear on each feature map. After the vehicle detection section 103 extracts the feature maps 509 to 511, the feature map validation section 104 compares each feature map with the placement pattern stored in advance and validates the likelihood that the input image contains the other vehicle on the basis of a comparison result. Specifically, in a case in which the placement of the active blocks and the inactive blocks in each of the feature maps 509 to 511 matches the corresponding placement pattern, the feature map validation section 104 determines that a probability that the feature map obtained by the convolution computation in the vehicle detection section 103 indicates the presence of the other vehicle is high. In this case, the feature map validation section 104 outputs a feature map validation signal taking on a signal value "TRUE." Conversely, in a case in which the placement of the active blocks and the inactive blocks in each of the feature maps 509 to 511 does not match the corresponding placement pattern, the feature map validation section 104 determines that the probability that the feature map obtained by the convolution computation in the vehicle detection section 103 indicates the presence of the other vehicle is low. In this case, the feature map validation section 104 outputs a feature map validation signal taking on a signal value "FALSE."

It is noted that the feature map validation section 104 preferably determines the placement pattern used for the comparison with each of the feature maps on the basis of the preferred direction set by the preferred direction selection section 102. The reason is as follows. Since the vehicle sensing region is set depending on the preferred direction, it is likely that the image of the other vehicle appearing in the vehicle sensing region varies with the different preferred direction and that the obtained feature map varies accordingly. For example, the feature map validation section 104 stores the placement pattern per preferred direction in advance, selects the placement pattern corresponding to the set preferred direction, and compares the selected placement pattern with the feature map. The feature map validation section 104 can thereby accurately perform the feature map validation even if the vehicle sensing region varies depending on the preferred direction.

The time series validation section 105 performs time series validation for validating a result of the feature map validation performed by the feature map validation section 104 in time series. In this time series validation, the time series validation section 105 makes the following primary correction to the result of the feature map validation performed by the feature map validation section 104 as needed on the basis of a history of values of the feature map validation signals output from the feature map validation section 104.

FIGS. 8A and 8B are a diagram depicting an example of the time series validation performed by the time series validation section 105. FIG. 8A is a time chart depicting an example in which the time series validation section 105 confirms the result of the feature map validation that the probability that the feature map indicates the presence of the other vehicle is high on condition that the feature map validation signals output from the feature map validation section 104 are "TRUE" consecutively the N times or more. On this condition, attention is paid to a case in which the value of the feature map validation signal is "FALSE"; thus, it is possible to strengthen the tendency to suppress the false detection of the other vehicle. While N=3 in the example of FIG. 8A, a value of N can be arbitrarily set.

In the example of FIG. 8A, the feature map validation section 104 outputs feature map validation signals taking on "TRUE" consecutively in time slots of time t1 to t3. As a result, the time series validation section 105 determines that the probability that the feature map indicates the other vehicle is high in the time slot of the time t3 that satisfies the above condition, and outputs a time series validation signal taking on a signal value "TRUE." On the other hand, the time series validation section 105 determines that the probability that the feature map indicates the other vehicle is low in the other time slots that do not satisfy the condition, and outputs time series validation signals each taking on a signal value "FALSE." While the values of the feature map validation signals output from the feature map validation section 104 are "TRUE" in the time slots of t5, t7, and t8, the time slots do not satisfy the above condition. Owing to this, the time series validation section 105 corrects the result of the feature map validation by the feature map validation section 104 and outputs time series validation signals each taking on the signal value "FALSE."

FIG. 8B is a time chart depicting an example in which the time series validation section 105 confirms, for the result of the feature map validation, that the probability that the feature map indicates the presence of the other vehicle is high on condition that the feature map validation signals output from the feature map validation section 104 are "TRUE" the M times or more among the last consecutive N times or more. On this condition, attention is paid to a case in which the value of the feature map validation signal is "TRUE"; thus, it is possible to strengthen the tendency to suppress the false detection of the other vehicle. While N=3 and M=2 in the example of FIG. 8B, values of N and M can be arbitrarily set.

In the example of FIG. 8B, the feature map validation section 104 outputs feature map validation signals taking on "TRUE" in time slots of time t1 to t3, t5, and t7 to t8. As a result, the time series validation section 105 determines that the probability that the feature map indicates the other vehicle is high in the time slots of the time t3 to t5 and t7 to t9 that satisfy the above condition, and outputs time series validation signals each taking on the signal value "TRUE." While the values of the feature map validation signals output from the feature map validation section 104 are "FALSE" in the time slots of t4 and t9, the time slots satisfy the above condition. Owing to this, the time series validation section 105 corrects the result of the feature map validation by the feature map validation section 104 and outputs time series validation signals each taking on the signal value "TRUE." On the other hand, the time series validation section 105 determines that the probability that the feature map indicates the other vehicle is low in the time slot of time t6 that does not satisfy the condition, and outputs a time series validation signal taking on a signal value "FALSE."

It is noted that the condition for the time series validation performed by the time series validation section 105 is not limited to the above example. An arbitrary condition can be set as long as the result of the feature map validation performed by the feature map validation section 104 can be validated in time series on this condition.

The detection result correction section 106 corrects the detection result about the other vehicle output by the vehicle detection section 103 on the basis of a result of the time series validation performed by the time series validation section 105. Specifically, the detection result correction section 106 calculates a total score for the detection result about the other vehicle by, for example, adding up a detection score that indicates a likelihood of the detection result about the other vehicle output from the vehicle detection section 103 and a validation score that indicates a likelihood of the time series validation result output from the time series validation section 105. In addition, the detection result correction section 106 corrects the detection result about the other vehicle by comparing the calculated total score with a predetermined threshold. It is noted that the detection result correction section 106 can correct the detection result about the other vehicle by a method other than this method. When a detection result to the effect that the other vehicle has been sensed within the vehicle sensing region after correction of the detection result about the other vehicle in this way, the detection result correction section 106 outputs a vehicle approach signal that represents that the other vehicle is approaching. Furthermore, in a case in which a normal process result is not obtained such as a case in which a situation of, for example, contradiction between the detection result about the other vehicle output by the vehicle detection section 103 and the result of the time series validation performed by the time series validation section 105 continues for a certain period of time, the detection result correction section 106 determines the situation as a situation in which reliability for processes by the image processing apparatus 10 falls and outputs a sensing FAIL signal.

The first embodiment of the present invention described so far exhibits the following functions and advantages.

(1) The image processing apparatus 10 includes the vehicle detection section 103, the feature map validation section 104, the time series validation section 105, and the detection result correction section 106. The vehicle detection section 103 performs the convolution computation on the input image based on the captured image obtained by capturing the image with the camera 20, and that detects the object, that is, the other vehicle. The feature map validation section 104 performs the feature map validation for validating the likelihood that the input image contains the other vehicle on the basis of the feature map obtained by the convolution computation performed by the vehicle detection section 103. The time series validation section 105 performs the time series validation for validating the result of the feature map validation performed by the feature map validation section 104 in time series. The detection result correction section 106 corrects the detection result about the other vehicle output by the vehicle detection section 103 on the basis of the result of the time series validation performed by the time series validation section 105. Configuring the image processing apparatus 10 in this way makes it possible to accurately sense the other vehicle present around the own vehicle from the captured image.

(2) The vehicle detection section 103 performs the convolution computation on the input image a plurality of times as depicted in FIGS. 5 and 6. The feature map validation section 104 performs the feature map validation on each of the plurality of feature maps obtained by the convolution computation performed the plurality of times, for example, the feature maps 509, 510, and 511 of FIGS. 5 and 6. Configuring the image processing apparatus 10 in this way makes it possible to accurately validate the likelihood that the input image contains the other vehicle in response to the times of the convolution computation performed by the vehicle detection section 103.

(3) The feature map validation section 104 performs the feature map validation by determining whether each of the plurality of blocks configuring each of the feature maps indicates features of the other vehicle. Specifically, as described with reference to FIGS. 7A-7C, the feature map validation section 104 performs the feature map validation on the basis of the placement of the blocks determined to indicate the features of the other vehicle that is the object in each feature map and the blocks determined not to indicate the features of the other vehicle that is the object in the feature map. Configuring the image processing apparatus 10 in this way makes it possible to accurately and easily perform the feature map validation.

(4) The image processing apparatus 10 is mounted in the own vehicle, and further includes the preferred direction selection section 102 that sets the direction in which the other vehicle that is the object is to be preferentially sensed on the basis of the driving state of the own vehicle. The feature map validation section 104 performs the feature map validation on the basis of a comparison result of comparison of the placement of the blocks with the placement pattern stored in advance. At this time, the feature map validation section 104 can determine the placement pattern for use in the comparison on the basis of the direction set by the preferred direction selection section 102. Configuring the image processing apparatus 10 in this way makes it possible to accurately perform the feature map validation even if the vehicle sensing region varies depending on the set direction.

Second Embodiment

Figure 9:
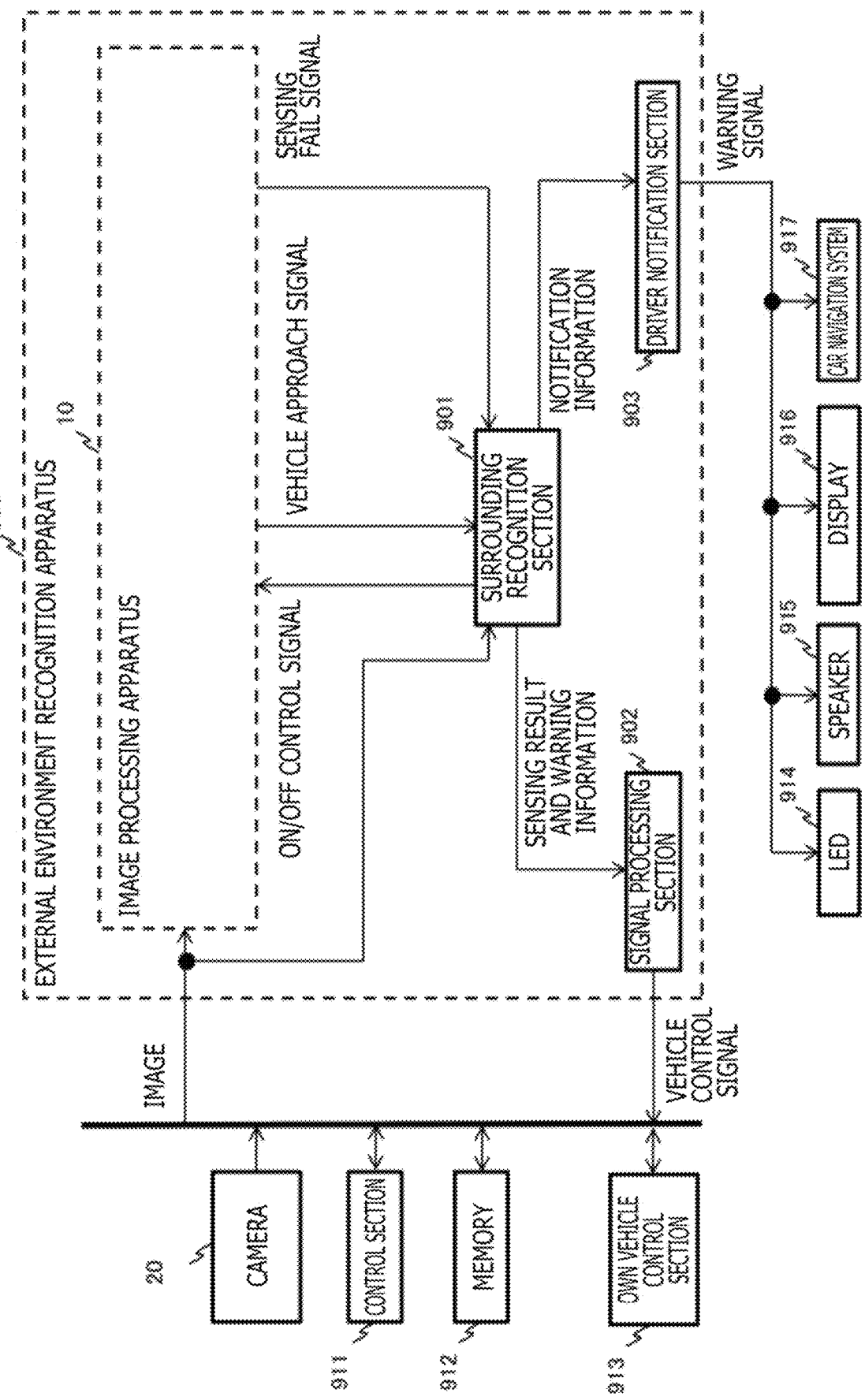
FIG. 9 is a diagram depicting an example of an external environment recognition apparatus according to a second embodiment of the present invention.

FIG. 9 is a diagram depicting an example of an external environment recognition apparatus according to a second embodiment of the present invention. As depicted in FIG. 9, an external environment recognition apparatus 900 according to the present embodiment is configured with the image processing apparatus 10 described in the first embodiment, a surrounding recognition section 901, a signal processing section 902, and a driver notification section 903. The external environment recognition apparatus 900 is connected to the camera 20 mounted in the own vehicle similarly to the image processing apparatus 10, and is also connected to a control section 911, a memory 912, an own vehicle control section 913, an LED 914, a speaker 915, a display 916, and a car navigation system 917 mounted in the own vehicle. It is noted that the image processing apparatus 10 and the other devices are mutually connected via a signal bus within the own vehicle.

The camera 20 acquires a captured image of surroundings of the own vehicle and outputs the captured image to the image processing apparatus 10 in the external environment recognition apparatus 900. The memory 912 temporarily retains the captured image acquired by the camera 20. The control section 911 exercises control over input/output of the captured image between the camera 20 and the external environment recognition apparatus 900 and input/output of a vehicle control signal between the external environment recognition apparatus 900 and the own vehicle control section 913.

The image processing apparatus 10 senses the other vehicle present around the own vehicle as described in the first embodiment, and outputs a vehicle approach signal based on the sensing result to the surrounding recognition section 901. Furthermore, in a case of a situation in which it is difficult to sense the other vehicle, the image processing apparatus 10 outputs a sensing FAIL signal to the surrounding recognition section 901.

When the vehicle approach signal is output from the image processing apparatus 10, the surrounding recognition section 901 executes a surrounding recognition process for recognizing a surrounding environment of the own vehicle on the basis of this vehicle approach signal. For example, the surrounding recognition section 901 analyzes surrounding spaces near and apart from the own vehicle using the captured image by the camera 20, recognizes whether the other vehicle including a motorcycle or a bicycle and a pedestrian are present, and recognizes whether an obstacle that obstructs driving or parking of the own vehicle is present. In addition, in a case in which the other vehicle or the pedestrian is rapidly approaching the own vehicle, the surrounding recognition section 901 senses this rapid approach, and predicts a collision between the own vehicle and the other vehicle or the pedestrian or predicts a collision between the own vehicle and an obstacle. Moreover, the surrounding recognition process may include a traffic lane departure warning process for issuing a warning in a case in which the own vehicle departs from a traffic lane during driving, a blind spot warning process for issuing a warning in a case in which a person or the other vehicle enters a blind spot of the driver of the own vehicle, or the like. The surrounding recognition section 901 outputs a sensing result or warning information based on an execution result of the surrounding recognition process to the signal processing section 902, and outputs notification information for the driver of the own vehicle to the driver notification section 903 as needed.

The signal processing section 902 generates the vehicle control signal for controlling an operation of the own vehicle on the basis of the sensing result and the warning information output from the surrounding recognition section 901, and transmits the vehicle control signal to the own vehicle control section 913. The own vehicle control section 913 stops the own vehicle for avoiding the collision between the own vehicle and the other vehicle or the pedestrian or changes a traveling direction of the own vehicle for avoiding the collision between the own vehicle and the obstacle by controlling the operation of the own vehicle on the basis of the vehicle control signal received from the signal processing section 902.

The driver notification section 903 generates a warning signal for warning the driver of the own vehicle on the basis of the notification information output from the surrounding recognition section 901, and transmits the warning signal to any of the LED 914, the speaker 915, the display 916, and the car navigation system 917. Upon reception of the warning signal from the driver notification section 903, each of the LED 914, the speaker 915, the display 916, and the car navigation system 917 makes predetermined display or audio output on the basis of the warning signal, thereby warning the driver of the own vehicle about the presence of the other vehicle, the pedestrian, the obstacle, or the like approaching the own vehicle.

When the image processing apparatus 10 outputs the sensing FAIL signal, then it is determined that it is difficult for the image processing apparatus 10 to sense the other vehicle, and the surrounding recognition section 901, therefore, preferably stops the operation of the image processing apparatus 10 either temporarily or continuously. Outputting an ON/OFF control signal to the image processing apparatus 10 enables the surrounding recognition section 901 to either start or stop the operation of the image processing apparatus 10. Furthermore, at this time, the surrounding recognition section 901 may output the notification information to the driver notification section 903, where the warning signal is generated on the basis of this notification information to transmit the warning signal to any of the LED 914, the speaker 915, the display 916, and the car navigation system 917, thereby notifying the driver of the own vehicle of that the operation of the image processing apparatus 10 is stopped.

According to the second embodiment of the present invention described so far, the external environment recognition apparatus 900 includes the image processing apparatus 10. Furthermore, the surrounding recognition section 901, the signal processing section 902, and the driver notification section 903 output at least one of the warning signal for warning the driver of the own vehicle and the vehicle control signal for controlling the operation of the own vehicle, on the basis of a corrected sensing result about the other vehicle corrected by the detection result correction section 106 in the image processing apparatus 10. Configuring the external environment recognition apparatus 900 in this way makes it possible to accurately recognize the surrounding environment of the own vehicle.

While the object to be sensed from the captured image has been assumed as the other vehicle present around the own vehicle in the embodiments described so far, the object is not limited to this other vehicle but may be an object other than the other vehicle. In addition, while the example of sensing the object using the captured image obtained by the camera 20 mounted in the vehicle has been described, the camera that acquires the captured image is not limited to that mounted in the vehicle. For example, the object can be sensed using a captured image acquired by a camera for various use applications other than the in-vehicle camera such as a camera for use in street monitoring.

The embodiments and various modifications described so far are given as an example only and the present invention is not limited to contents of these embodiments and modifications as long as features of the invention are not hampered. The present invention is not limited to the embodiments and the modifications described above but can be changed in a various manner in a range without departure from the purport of the present invention.

A disclosure content of the following priority application is incorporated herein by reference.

Japanese Patent Application No. 2016-244043 (filed Dec. 16, 2016)

REFERENCE SIGNS LIST

10: Image processing apparatus
20: Camera
101: Image correction section
102: Preferred direction selection section
103: Vehicle detection section
104: Feature map validation section
105: Time series validation section
106: Detection result correction section
900: External environment recognition apparatus
901: Surrounding recognition section
902: Signal processing section
903: Driver notification section

The invention claimed is:

1. An image processing apparatus comprising:
a memory;
an input/output device; and
a processor communicatively coupled to the memory and the input/output device, wherein the processor is configured to:
perform convolution computation on an input image based on a captured image obtained by capturing the image with a camera, and that detects an object,
perform feature map validation validating a likelihood that the input image contains the object on a basis of a feature map obtained by the convolution computation,
perform time series validation validating in time series a result of the feature map validation,
correct a detection result about the object, the detection result being output by input/output device, when result of the time series validation does not satisfy a predetermined condition,
check timewise consecutiveness of an output about the result of the feature map validation, and correct the result of the feature map validation on a basis of a determination condition whether or not the output is consecutive a predetermined set times or more, and
correct the detection result about the object, the detection result being output by the input/out device, on a basis of a correction result about the result of the feature map validation, wherein
the feature map is configured with a plurality of blocks,
the processor determines whether or not each of the plurality of blocks configuring each of the feature maps indicates features of the object, and performs the feature map validation on a basis of placement of blocks determined to indicate the features of the object in the feature map and blocks determined not to indicate the features of the object in the feature map, and
the processor outputs a signal indicating that the object cannot be detected when a case in which the result of the time series validation does not satisfy the predetermined condition continues for a predetermined period of time.

2. The image processing apparatus according to claim 1, wherein
the processor performs the convolution computation on the input image a plurality of times, and
the processor performs the feature map validation on each of a plurality of the feature maps obtained by the convolution computation performed the plurality of times.

3. The image processing apparatus according to claim 1, wherein
the processor performs the feature map validation on a basis of a comparison result of comparison of the placement with a placement pattern stored in advance.

4. The image processing apparatus according to claim 1, wherein
the image processing apparatus is mounted in an own vehicle, and
the object is an other vehicle present around the own vehicle.

5. The image processing apparatus according to claim 4, wherein the processor is further configured to
set a direction in which the object is to be preferentially sensed on a basis of a driving state of the own vehicle,
perform the feature map validation on a basis of a comparison result of comparison of the placement with a placement pattern stored in advance, and
determine the placement pattern for use in the comparison, on a basis of the direction set.

6. The image processing apparatus according to claim 3, wherein
the image processing apparatus is mounted in an own vehicle, and
the object is an other vehicle present around the own vehicle.

7. An external environment recognition apparatus comprising:
an image processing apparatus comprising:
a memory;
an input/output device; and
a processor communicatively coupled to the memory and the input/output device, wherein the processor is configured to:
perform convolution computation on an input image based on a captured image obtained by capturing the image with a camera, and that detects an object,
perform feature map validation validating a likelihood that the input image contains the object on a basis of a feature map obtained by the convolution computation,
perform time series validation validating in time series a result of the feature map validation,
correct a detection result about the object, the detection result being output by input/output device, when result of the time series validation does not satisfy a predetermined condition,
check timewise consecutiveness of an output about the result of the feature map validation, and correct the result of the feature map validation on a basis of a determination condition whether or not the output is consecutive a predetermined set times or more, and
correct the detection result about the object, the detection result being output by the input/out device, on a basis of a correction result about the result of the feature map validation, wherein the feature map is configured with a plurality of blocks, the processor determines whether or not each of the plurality of blocks configuring each of the feature maps indicates features of the object, and performs the feature map validation on a basis of placement of blocks determined to indicate the features of the object in the feature map and blocks determined not to indicate the features of the object in the feature map, and the processor outputs a signal indicating that the object cannot be detected when a case in which the result of the time series validation does not satisfy the predetermined condition continues for a predetermined period of time, the image processing apparatus is mounted in an own vehicle, the object is an other vehicle present around the own vehicle, and the external environment recognition apparatus outputs at least one of a warning signal for warning a driver of the own vehicle and a vehicle control signal for controlling an operation of the own vehicle, on a basis of a corrected sensing result about the other vehicle, the corrected detection result being corrected by the processor.

8. An image processing apparatus comprising:

a memory;

an input/output device; and a processor communicatively coupled to the memory and the input/output device, wherein the processor is configured to:

perform convolution computation on an input image based on a captured image obtained by capturing the image with a camera, and that detects an object, perform feature map validation validating a likelihood that the input image contains the object by comparing a feature map obtained by the convolution computation with a pattern for the feature map, the pattern being stored in advance and related to the object, perform time series validation validating in time series a result of the feature map validation, correct a detection result about the object, the detection result being output by the input/output device, when a result of the time series validation does not satisfy a predetermined condition, check timewise consecutiveness of an output about the result of the feature map validation, and correct the result of the feature map validation on a basis of a determination condition whether or not the output is consecutive a predetermined set times or more, and correct the detection result about the object, the detection result being output by the input/out device, on a basis of a correction result about the result of the feature map validation.

9. The image processing apparatus according to claim 1, wherein the predetermined condition is that a predetermined result of the feature map validation continues a predetermined number of times consecutively in a time series.

10. The image processing apparatus according to claim 8, wherein the predetermined condition is that a predetermined result of the feature map validation continues a predetermined number of times consecutively in a time series.

* * * * *